March 24, 1959    J. R. MARTIN    2,878,670
VISCOSIMETER
Filed July 24, 1957    3 Sheets-Sheet 1
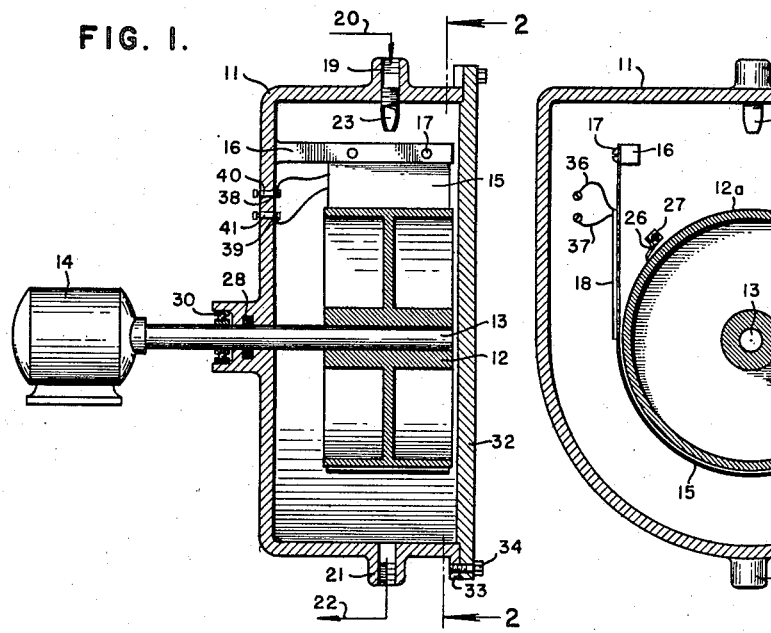
FIG. 1.
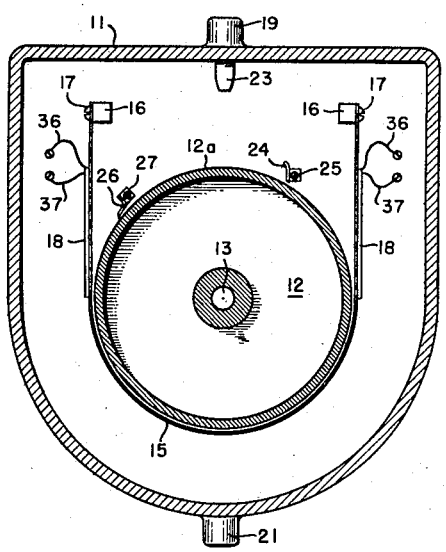
FIG. 2.
FIG. 3.
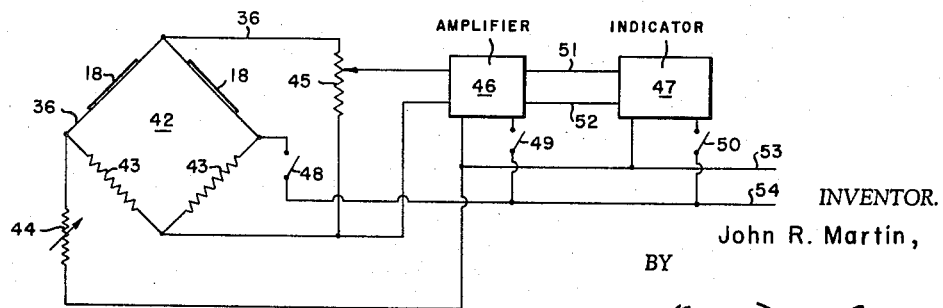
FIG. 4.
INVENTOR.
John R. Martin,
BY
ATTORNEY.

March 24, 1959  J. R. MARTIN  2,878,670
VISCOSIMETER

Filed July 24, 1957  3 Sheets-Sheet 2

INVENTOR.
John R. Martin,
BY
ATTORNEY

United States Patent Office 2,878,670
Patented Mar. 24, 1959

2,878,670

VISCOSIMETER

John R. Martin, Baytown, Tex., assignor, by mesne assignments, to Esso Research and Engineering Company, Elizabeth, N.J., a corporation of Delaware Application July 24, 1957, Serial No. 673,797

7 Claims. (Cl. 73—60)

The present invention is directed to apparatus for determining viscosity of liquids. More particularly, the invention is directed to apparatus for continuously determining the viscosity of a flowing liquid. In its more specific aspects, the invention is directed to apparatus for measuring the viscosity of a liquid employing small quantities of the liquid.

The present invention may be briefly described as apparatus for determining the viscosity of a liquid which comprises a housing having an inlet and an outlet for introducing and removing liquid from the housing. Positioned in the housing between the inlet and outlet is a rotatable member having an outer cylindrical peripheral surface. A means such as a shaft is connected to the rotatable member and extends outside of the housing and is connected to rotating means such as an electric motor. Arranged around and spaced away from the rotatable member in the housing is an elastically deformable member which may be a distance from the housing approximately film thickness of the liquid. The elastically deformable member embraces a substantial portion of the surface which may range from about 90° to about 180° of the surface. The elastic member is attached by its ends to the housing, and a strain gauge is bonded to or mounted on the elastically deformable member. An indicating recording means is electrically connected to the strain gauge and is responsive to changes in the electrical resistance of the strain gauge when stressed for indicating the liquid viscosity. Means are arranged in the housing for distributing liquid introduced through the inlet on the surface in the space between surface and elastic member. Means may also be provided for removing excess liquid from the surface. This removing means may be horizontally spaced from the distributing means.

The elastically deformable member is suitably a metallic band member constructed of metal such as rolled brass. The elastically deformable band member may have a width substantially the same as the rotatable member and a thickness preferably of approximately 0.003". The width of the elastic band member may suitably be approximately 1". It is contemplated that the elastic band member may have a thickness in the range from about 0.001" to about 0.009", while the width of the elastic band member may range from about ½" up to about 2". The sensitivity of the device may be increased or decreased by varying the thickness of the band member. Decreasing the thickness increases sensitivity. Therefore, it is contemplated that band members of different thicknesses may be used. The range given is preferred.

Ordinarily, a plurality of strain gauges are suitably employed. For example, first and second strain gauges may be attached to or mounted on the elastic member. When more than one strain gauge is used, the strain gauges are suitably mounted on the elastic band member in like angularity to the grain of the metal. If the strain gauges are not mounted in like manner with respect to the grain of the metal member, unsatisfactory and inaccurate results are obtained. It is desirable to employ at least two strain gauges, since one strain gauge is in tension and one strain gauge is in compression. Furthermore, employing two strain gauges compensates for the effect of temperature which may affect the accuracy of the operation.

It is contemplated that the housing in which the elements of the present invention are arranged may suitably be a pressure tight housing which will allow the obtaining of viscosity of liquids at elevated temperatures. Ordinarily, however, the temperatures at which viscosity will be determined may range from about 60° up to about 250° F., although viscosities may be obtained at higher temperatures of the order of 500° to 800° F.

The present invention will be further illustrated by reference to the drawings in which:

Fig. 1 is a view in partial section of the apparatus of the present invention;

Fig. 2 is a view taken along the lines 2—2 of Fig. 1;

Fig. 3 is a perspective view with parts removed of the embodiment of Figs. 1 and 2;

Fig. 4 shows a wiring diagram for the device of the present invention;

Figure 5:
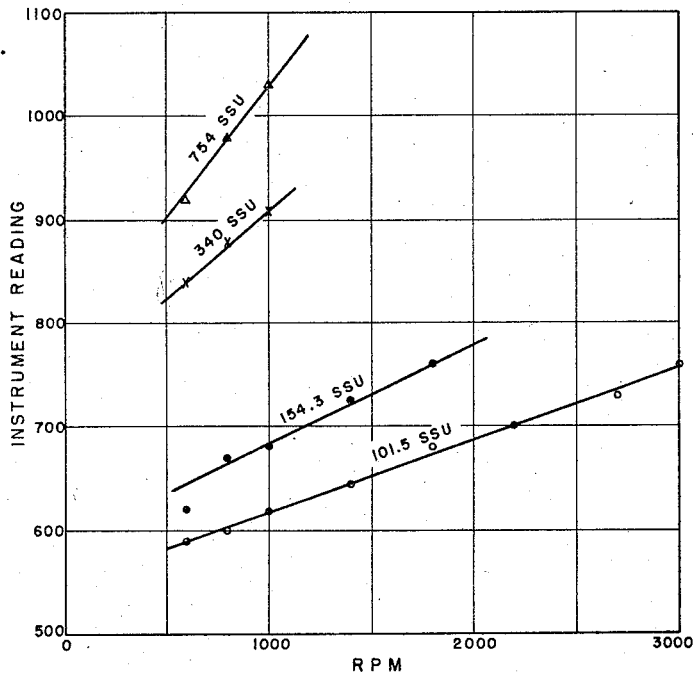
Fig. 5 is a plot of data showing the instrument reading for various viscosity oils against revolutions of the rotatable member.

Referring now to the drawing and particularly to Figs. 1, 2, and 3, numeral 11 designates a housing having a rotatable member 12 arranged therein connected to a shaft 13 which extends to the outside of the housing and is connected to a motor 14, which is suitably an electric motor. Arranged around about 180° of the rotatable member 12 is an elastically deformable member 15 which is attached by support members 16 to the housing 11 suitably by screws 17.

Carried on the exterior of the elastically deformable member 15 are a plurality of strain gauges 18 which suitably are arranged adjacent the ends of the member 15.

The housing 11 is provided with an inlet 19 connected by line 20 to a source of the liquid which is to be tested and an outlet 21 connected by line 22 to a discharge for the liquid introduced by line 20 through inlet 19. The inlet 19 has threadedly connected thereto an orifice member 23 which may be suitably sized to introduce the sample into the housing 11. Arranged adjacent the rotatable member 12 is a distributing means 24 which is connected by a screw 25 to the housing 11 and horizontally spaced away from the distributing means 24 is a removing means or knife member 26 which is also attached to the housing 11 by a screw 27. The removing means 26 serve to remove excess liqiud from the surface 12a of the rotatable member 12. It is to be noted that the elastically deformable member 15 is spaced away from the surface 12a. Suitably the elastically deformable member 15 is spaced away from the surface 12a a sufficient distance corresponding to the film thickness of the liquid introduced through inlet 19. This distance may be as great at ⅟₃₂ of an inch.

The shaft 13 is suitably sealed in the housing by means of a seal member 28 and rotates on a bearing 30.

The housing 11 is provided with a removable cover plate 32 which may be threadedly connected to eyes 33 forming part of the housing 11 by means of threaded bolts 34.

Referring specifically to Fig. 3, the elastically deformable member 15 has strain gauges 18 arranged adjacent the ends of the elastically deformable member 15 connected to the supporting members 16 by threaded screws 17. It is to be noted that the resistant elements 18a of the strain gauges 18 are both arranged at right angles to the grain of the metal member 15. If the resistant elements are arranged otherwise to the grain of the metal, unsatisfactory and inaccurate results are obtained.

The strain gauges 18 are connected by suitable electrical leads 36 and 37 to posts 38 and 39 which lead inside the housing 11 through electrically insulated bushings 40 and 41 and suitably forms part of a circuit such as shown more clearly in Fig. 4. The Wheatstone bridge, generally indicated by the numeral 42, is provided with fixed resistances 43, a variable resistance 44, a potentiometer 45, an amplifier 46, and an indicator or recording means 47. Switches 48, 49, and 50 are also supplied circuitously, the amplifier 46 and indicator 47 being electrically interconnected by leads 51 and 52. A source of 110 A.C. current supplies energy through leads 53 and 54.

In employing the device of the present invention a liquid, such as a hydrocarbon, is introduced through the inlet 19 and distributed by means of the distributing means 24 on a surface 12a, the liquid being dropped onto the surface 12a. The motor 14 causes the rotating member 12 to rotate which places one of the strain gauges in compression and the other in tension. Since the strain gauges are stressed by virtue of the film of oil in the space between the elastically deformable member 15 and the surface 12a, the strain gauges are deformed and cause an electrical effect to be observed on the indicator or recording means 43 which is a function of the viscosity of the oil. Excess liquid is removed from the surface 12a, and the liquid then flows to the outlet 21. This liquid may accumulate as a pool in the housing 11 and be withdrawn by line 22.

The viscosity of the oil as reflected by the signal from the strain gauges may suitably be read directly from the indicator when calibrated or the revolutions per minute of the rotatable member 12 may be plotted against the instrument reading from curves of the known viscosity of the oil.

In order to illustrate the effect of viscosity of the several oils on the instrument reading and revolutions per minute of the rotatable member, reference is had to Fig. 5 in which a plot of data, instrument reading versus revolutions per minute, is shown for oils of viscosities of 101.5 Saybolt Universal seconds, 154.3 Saybolt Universal seconds, 340 Saybolt Universal seconds, and 754 Saybold Universal seconds. It is to be noted that a linear relationship obtains. These data from Fig. 5 are then shown in Fig. 6 as instrument readings versus viscosity. It is to be noted that the viscosity may be read directly from the instrument reading.

Figure 6:
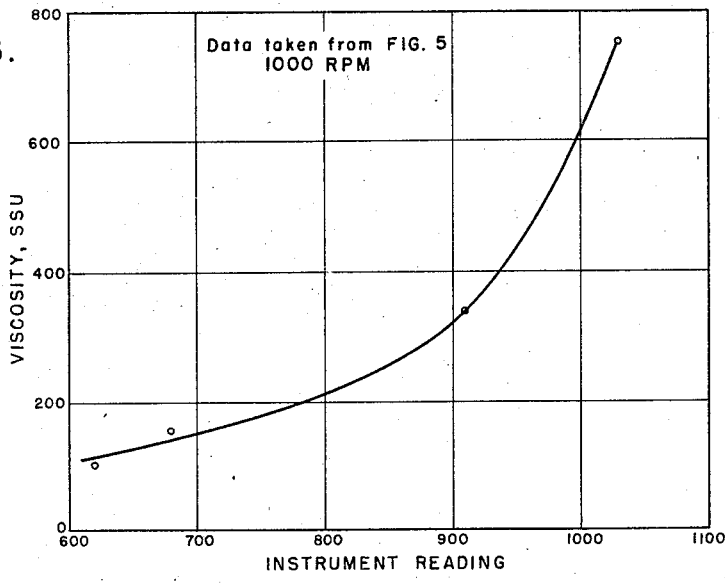
Fig. 6 is a plot of data showing the relationship between viscosity Saybolt Universal in seconds against the instrument reading.
Figure 7:
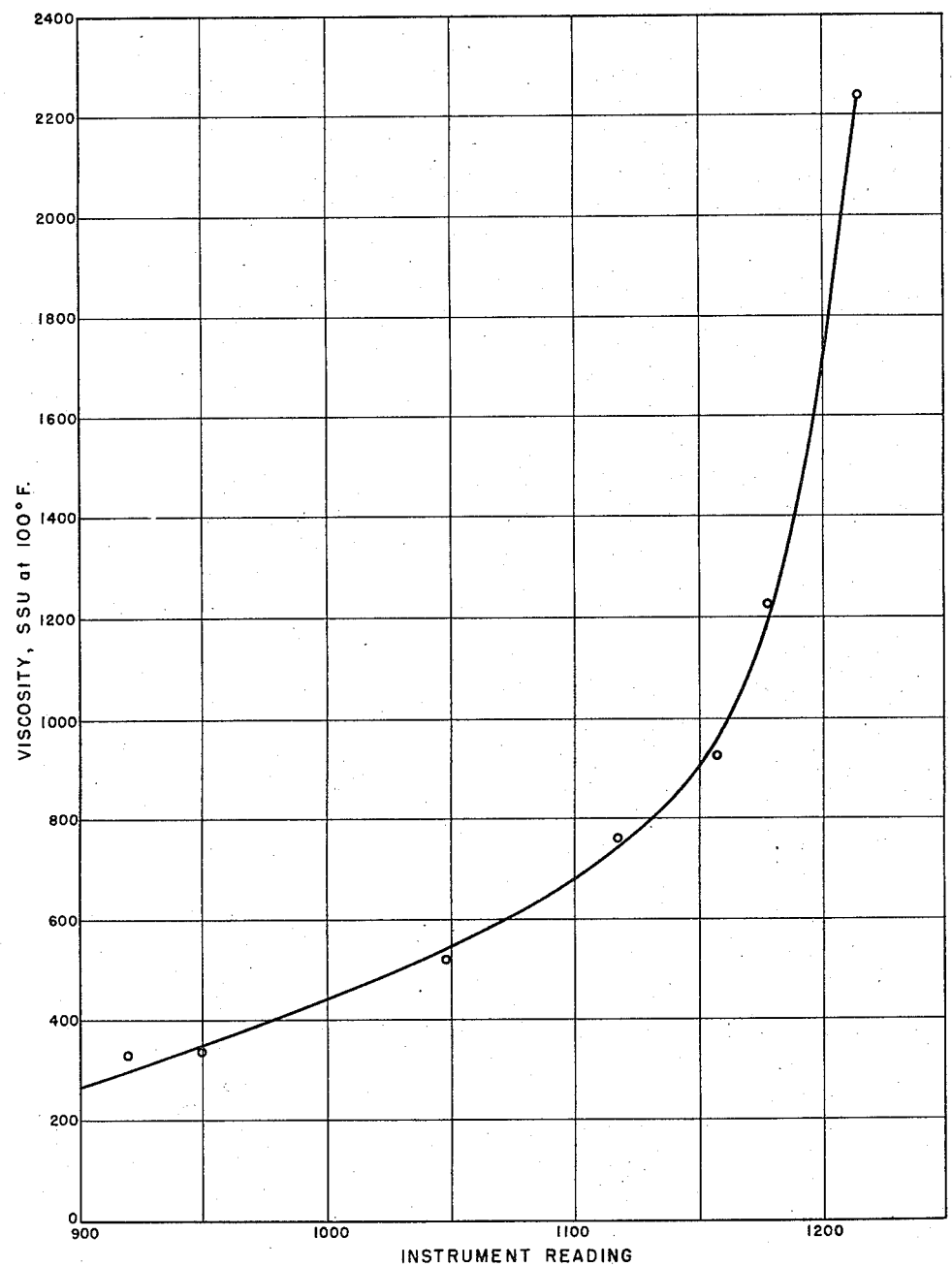
Fig. 7 is a similar plot of data to Fig. 6.

Fig. 7 is a similar plot of data to Fig. 6 where determinations were made at 73° F. at a constant revolutions per minute of 125. Again the plot of data shows a relationship between the instrument reading and the viscosities in Saybolt Universal seconds at 100° F.

The present invention is quite advantageous and useful in determining the viscosities of all types of liquid. For example, the viscosities of hydrocarbons such as crude oil, gasoline, kerosene, gas oils, lubricating oils and heavier fractions may be determined with the present invention. Furthermore, the invention is such that viscosity may be determined under pressure and at elevated temperatures if necessary, since the housing is suitably made gas-tight to maintain a liquid phase if necessary. Also, the instrument is quite small and compact and may suitably be arranged on an operating unit. For example, it may be arranged on a lubricating oil refining unit and be used to monitor the viscosity of the refined lubricating oil. The signal obtained from the device, such as an indicator or recording means, may be used to position a valve or control a process operating variable.

The device by virtue of its rugged construction and sensitive nature may suitably be used for precise measurements of viscosity of substantially all liquids, and it is a very satisfactory laboratory instrument.

The elastically deformable member is suitably constructed of rolled brass but may be constructed of many materials, examples of which include low carbon steel, rolled Monel metal, nickel steel, and the like. The elastically deformable member is suitably constructed of a metal having proportional limits in tensile strength in the range from about 25,000 to 60,000 p.s.i. For example, Monel metal has a tensile strength of about 50,000 p.s.i. while that of low carbon steel is in the range from about 35,000 to 60,000 p.s.i. Nickel steel (3.5% nickel) has a tensile strength of about 50,000 p.s.i.

The nature and objects of the present invention having been completely described and illustrated, what I wish to claim as new and useful and secure by Letters Patent is:

1. Apparatus for determining the viscosity of a liquid which comprises a housing having an inlet and an outlet, a rotatable member having an outer cylindrical peripheral surface positioned within the housing between the inlet and the outlet, means connected to said rotatable member for rotating same, an elastic member positioned around and spaced away from said rotatable member to embrace a substantial portion of said surface, said elastic member being attached by its ends to said housing, a strain gauge mounted on said elastic member, indicating means electrically connected to said strain gauge responsive to changes in the electrical resistance of the strain gauge when stressed for indicating liquid viscosity, and means in said housing for distributing liquid from the inlet on said surface in the space between the surface and the elastic member.

2. Apparatus for continuously determining the viscosity of a flowing liquid which comprises a housing having an inlet and an outlet, a rotatable member having an outer cylindrical peripheral surface positioned within the housing between the inlet and the outlet, means connected to said rotatable member for rotating same, an elastic member positioned around and spaced away from said rotatable member a distance approximately equal to film thickness of said liquid to embrace approximately 180° of said surface, said elastic member being attached by its ends to said housing, a strain gauge mounted on said elastic member, indicating means electrically connected to said strain gauge responsive to changes in the electrical resistance of the strain gauge when stressed for indicating liquid viscosity, and means in said housing for distributing liquid flowing from the inlet to the outlet on said surface in the space between the surface and the elastic member.

3. Apparatus for continuously determining the viscosity of a flowing liquid which comprises a housing having an inlet and an outlet, a rotatable member having an outer cylindrical peripheral surface positioned within the housing between the inlet and the outlet, motor means connected to said rotatable member for rotating same, an elastic band member positioned around and spaced away from said rotatable member a distance approximately equal to film thickness of said liquid to embrace approximately 180° of said surface, said elastic band member being constructed of rolled brass and having a width substantially the same as the rotatable member and a thickness of approximately 0.003 inch and being attached by its ends to said housing, a plurality of strain gauges mounted on said elastic band member in like angularity to the grain of the brass, indicating means electrically connected to said strain gauges responsive to changes in the electrical resistance of the strain gauges when stressed for indicating liquid viscosity, and means in said housing for distributing liquid flowing from the inlet to the outlet on sad surface in the space between the surface and the elastic member.

4. Apparatus in accordance with claim 3 in which the width of the elastic band member is approximately one inch.

5. Apparatus for determining the viscosity of a liquid which comprises a housing having an inlet and an outlet, a rotatable member having an outer cylindrical peripheral surface positioned within the housing between the inlet and the outlet, means connected to said rotatable member for rotating same, an elastic member positioned around and spaced away from said rotatable member to embrace a substantial portion of said surface, said elastic member being attached by its ends to said housing, a strain gauge mounted on said elastic member, indicating means electrically connected to said strain gauge responsive to changes in the electrical resistance of the strain gauge when stressed for indicating liquid viscosity, means in said housing for distributing liquid from the inlet on said surface in the space between the surface and the elastic member, and means in said housing horizontally spaced from the distributing means for removing excess liquid from said surface.

6. Apparatus for continuously determining the viscosity of a flowing liquid which comprises a housing having an inlet and an outlet, a rotatable member having an outer cylindrical peripheral surface positioned within the housing between the inlet and the outlet, means connected to said rotatable member for rotating same, an elastic member positioned around and spaced away from said rotatable member a distance approximately equal to film thickness of said liquid to embrace approximately 180° of said surface, said elastic member being attached by its ends to said housing, a strain gauge mounted on said elastic member, indicating means electrically connected to said strain gauge responsive to changes in the electrical resistance of the strain gauge when stressed for indicating liquid viscosity, means in said housing for distributing liquid flowing from the inlet to the outlet on said surface in the space between the surface and the elastic member, and means in said housing horizontally spaced from the distributing means for removing excess liquid from said surface.

7. Apparatus for determining the viscosity of a liquid which comprises a housing having an inlet and an outlet, a rotatable member having an outer cylindrical peripheral surface positioned within the housing between the inlet and the outlet, means connected to said rotatable member for rotating same, an elastic metallic band member positioned around and spaced away from said rotatable member to embrace a substantial portion of said surface, said elastic member being attached by its ends to said housing, first and second strain gauges mounted on said elastic metallic band member in like angularity to the grain of the metal, indicating means electrically connected to said strain gauges responsive to changes in the electrical resistance of the strain gauges when stressed for indicating liquid viscosity, and means in said housing for distributing liquid flowing from the inlet to the outlet on said surface in the space between the surface and the elastic member.

References Cited in the file of this patent
UNITED STATES PATENTS

| | | |
|---|---|---|
| 1,578,730 | Henricksen et al. | Mar. 30, 1926 |
| 2,471,423 | Gisser | May 31, 1949 |

FOREIGN PATENTS

| | | |
|---|---|---|
| 94,718 | Germany | Nov. 10, 1897 |